US006530145B1

(12) United States Patent
Beigay et al.

(10) Patent No.: US 6,530,145 B1
(45) Date of Patent: Mar. 11, 2003

(54) FIXTURE AND METHOD FOR LIQUID ELECTROLYTE IMPREGNATION OF A BATTERY CELL

(75) Inventors: Mark Beigay, Newton, NC (US); Bobby Dean, Granite Falls, NC (US); J. Richard Raines, Hickory, NC (US); H. Wayne Swofford, Newton, NC (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/406,784

(22) Filed: Sep. 28, 1999

(51) Int. Cl.[7] .......................... H01M 2/36; H01M 10/04
(52) U.S. Cl. .................. 29/730; 429/52; 429/82; 429/100; 429/186; 429/95
(58) Field of Search ................ 429/52, 82, 89, 429/95, 72, 204, 186, 100; 29/73, 623.5

(56) References Cited

U.S. PATENT DOCUMENTS

| 3,343,994 A | * | 9/1967 | Stanimirovitch | |
| 3,615,857 A | * | 10/1971 | Methlie | |
| 4,326,015 A | | 4/1982 | Kohler | |
| 4,588,662 A | | 5/1986 | McManis, III et al. | |
| 4,730,383 A | * | 3/1988 | Balkanski | 29/623.5 |
| 5,201,924 A | | 4/1993 | Mix et al. | |
| 5,512,160 A | | 4/1996 | Lim | |
| 5,690,703 A | * | 11/1997 | Mitchell et al. | 29/623.5 |

FOREIGN PATENT DOCUMENTS

JP  7-99050  * 4/1995

* cited by examiner

*Primary Examiner*—John S. Maples
(74) *Attorney, Agent, or Firm*—Sughrue Mion, PLLC

(57) ABSTRACT

A fixture, for liquid electrolyte impregnation of an electrochemical cell, includes a base on which a cap is removably provided. The base includes a nest that receives the electrochemical cell. The cap includes a fill port in communication with the nest. In order to impregnate the cell, a vacuum is created in the nest via the fill port. Subsequently, the electrolyte is injected through the fill port and into the nest. The vacuum may be applied via the fill port, or alternatively, a vacuum port may be provided in the cap through which the vacuum is applied.

10 Claims, 4 Drawing Sheets

FIXTURE AND METHOD FOR LIQUID ELECTROLYTE IMPREGNATION OF A BATTERY CELL

FIELD OF THE INVENTION

The present invention relates in general to electrochemical energy sources, and more particularly to impregnating a battery cell with a liquid electrolyte.

BACKGROUND

A battery cell may include one or more sub assemblies known as cell stacks. The number of cell stacks that form the cell depends on the particular application. Each cell stack is formed by stacking plates together. For example, a central foil plate may be sandwiched between a pair of polymer plates, and the polymer plates may be sandwiched between a pair of outer foil plates. It is to be appreciated, however, that the plate materials and stack arrangements vary according to the particular application.

Conventionally, the cell stacks are assembled together to form cells. The cells are then packaged or assembled in a battery casing. Subsequently, the cells are activated by introducing a liquid electrolyte into the cell. Various techniques are used to fill the cells with the electrolyte. These techniques include pouring the electrolyte from a holding container into a cell filling port, and squirting the electrolyte into the cell using a squeeze bottle or syringe. It is also known to provide a flexible container as part of the battery housing to store the electrolyte prior to its dispersal into the battery cells.

Although these conventional techniques are generally thought to be acceptable, they are not without shortcomings. In particular, the devices that discharge the electrolyte are cumbersome and unreliable. For example, during the filling process, electrolyte may inadvertently contaminate the opening of the package in which the cell is disposed. The electrolyte on the opening compromises the seal that is subsequently provided to close the package opening. Also, conventional filling techniques do not provide adequate control over electrolyte uptake, and they require a significant amount of electrolyte that is not absorbed.

It is an object of this invention to provide a fixture and a method for liquid electrolyte impregnation of a battery cell that provides 1) improved package reliability, 2) improved control over electrolyte delivery and uptake, and 3) reduced electrolyte consumption.

SUMMARY OF THE INVENTION

The invention resides in a fixture for fabricating an electrochemical cell. The fixture includes an enclosure with a nest that is shaped to receive the electrochemical cell therein. The enclosure is provided with a fill port that is in communication with the nest. The fill port provides a passage through which an electrolyte is injected into the nest. The fill port may also provide a passage through which a vacuum is applied to the electrochemical cell. In an alternative embodiment, the enclosure is provided with two dedicated ports: a fill port through which the electrolyte is injected; and a vacuum port through which a vacuum is pulled.

The invention also resides in a method for fabricating an electrochemical cell. First, the cell is placed in an enclosure which is not a part of the battery. A vacuum is then applied to the enclosure. And finally, a liquid electrolyte is introduced into the enclosure, thereby impregnating the electrochemical cell with electrolyte.

The above and other features of the invention including various and novel details of construction and process steps will now be more particularly described with reference to the accompanying drawings and pointed out in the claims. It will be understood that the particular apparatus and method for liquid electrolyte impregnation of a battery cell embodying the invention is shown by way of illustration only and not as a limitation of the invention. The principles and features of this invention may be employed in varied and numerous embodiments without departing from the scope of the invention.

DETAILED DESCRIPTION OF THE INVENTION

I. The Fixture

Figure 1:
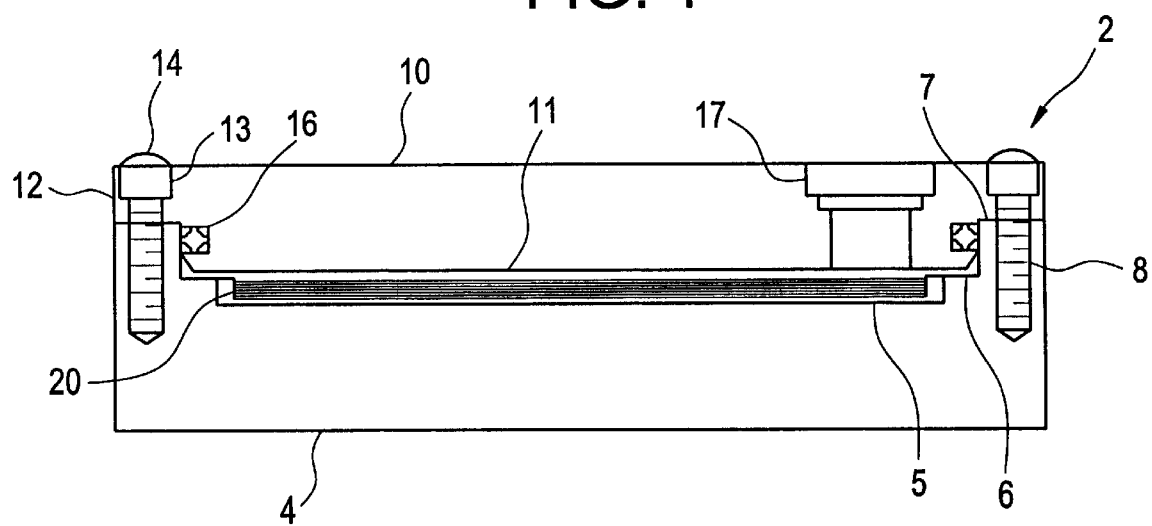
FIG. 1 is a sectional view of a fixture according to a first embodiment of the present invention.

FIG. 1 shows a fixture 2 used in a liquid electrolyte impregnation process, according to one embodiment of the present invention. The fixture 2 includes a base 4 on which a cap 10 is removably provided. The base 4 and cap 10 enclose a cell 20.

The base 4 includes a nest 5 that accommodates the cell 20. A shoulder 6 surrounds the nest 5, and a rim 7 surrounds the shoulder 6. The rim 7 is provided with threaded holes 8.

The cap 10 includes a flat 11 that extends across the nest 5 and engages with the shoulder 6. A flange 12 extends from the flat 11 and engages with the rim 7. The flange 12 is provided with holes 13 that correspond to the holes 8 in the base 4. Thus, bolts 14 may be inserted into the holes 13 and threaded into the holes 8 to secure the cap 10 to the base 4. The cap 10 supports an O-ring 16 that provide an air-tight seal between the cap 10 and the base 4.

The cap 10 is also provided with a fill port 17 that extends through the flat 11, such that the fill port 17 is in fluid communication with the nest 5. The fill port 17 allows a vacuum to be drawn on the cell 20, and provides a passage for the subsequent injection of liquid electrolyte into the nest 5. Various structures are known that can pull a vacuum and inject a liquid through a single port Therefore, a detailed discussion of these structures is omitted.

Figure 2:
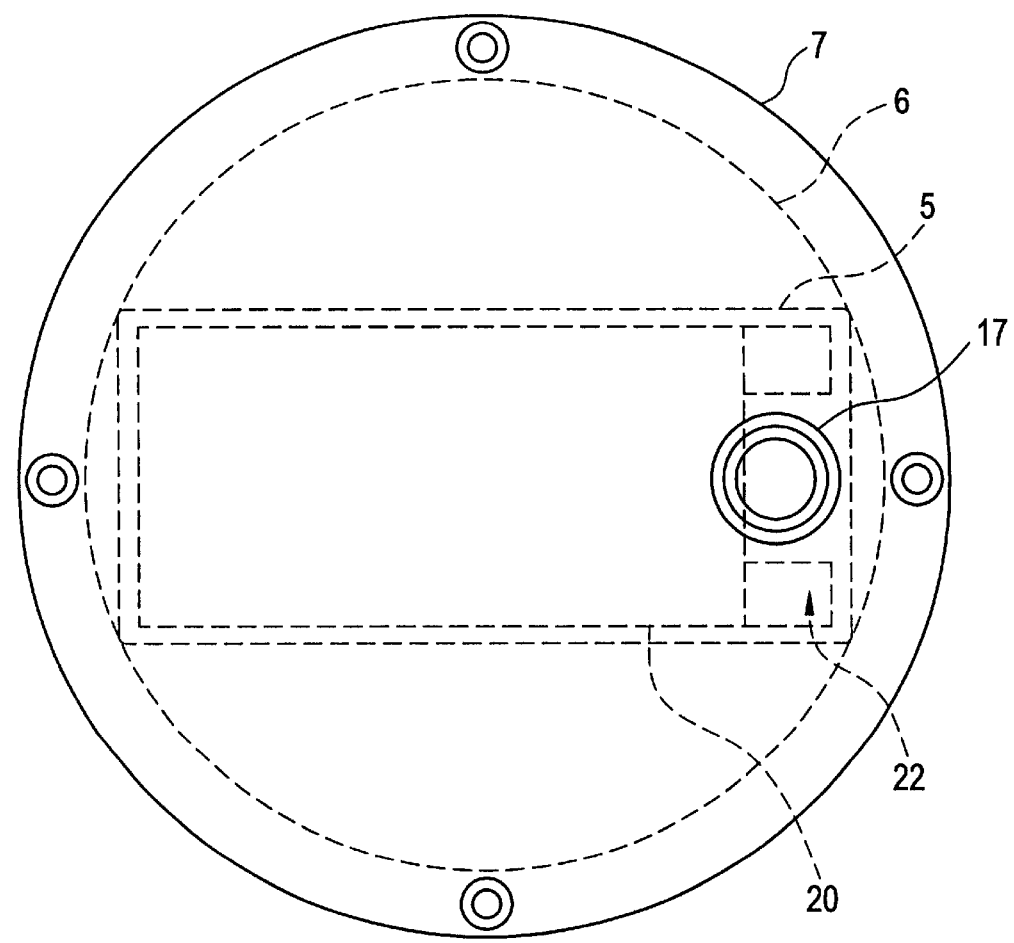
FIG. 2 is a plan view of the fixture shown in FIG. 1.

Turning to FIG. 2, the fill port 17 superposes over a tab area 22 of the cell 20. The tab area 22 may be used to connect the cell 20 to other battery elements. Also, the tab area 22 may provide a means for handling the cell 20. It is to appreciated, however, that cells may be manufactured without the tab area 22. Further, the fill port 17 maybe located anywhere in the cap 10 so long as it is in fluid communication with the nest 5.

Figure 3:
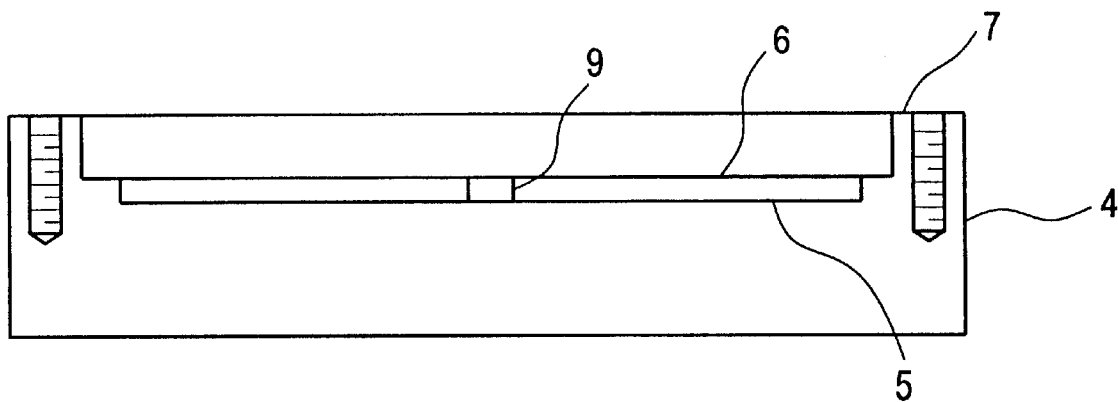
FIG. 3 is a sectional view of a base of the fixture according to a second embodiment of the present invention.
Figure 4:
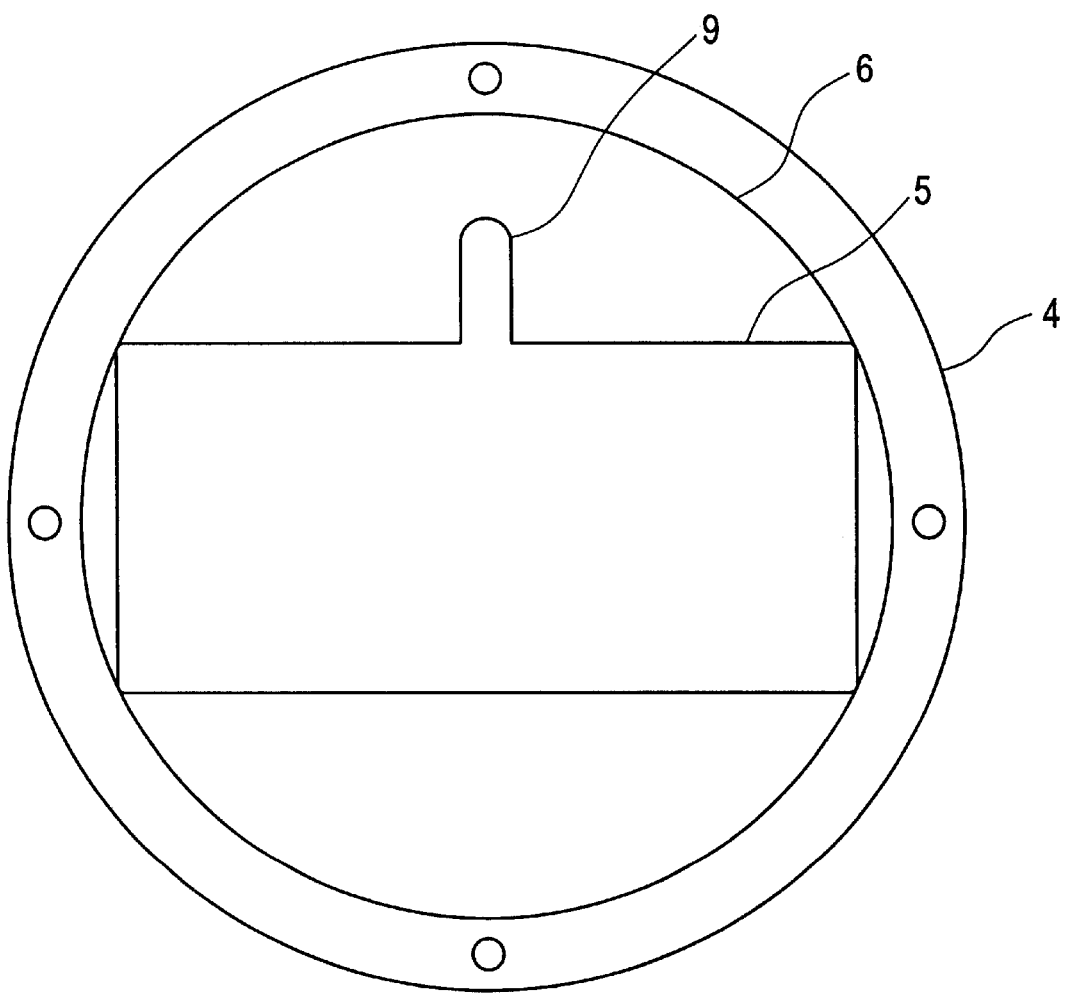
FIG. 4 is a plan view of the base shown in FIG. 3.
Figure 5:
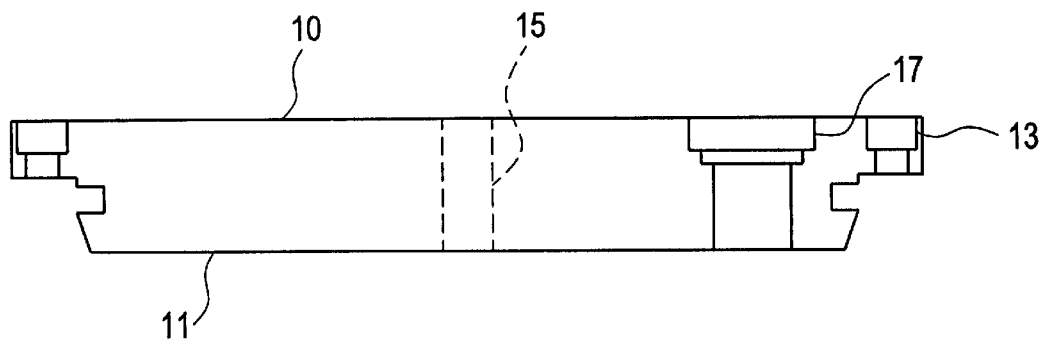
FIG. 5 is a sectional view of a cap of the fixture according to a third embodiment of the present invention.
Figure 6:
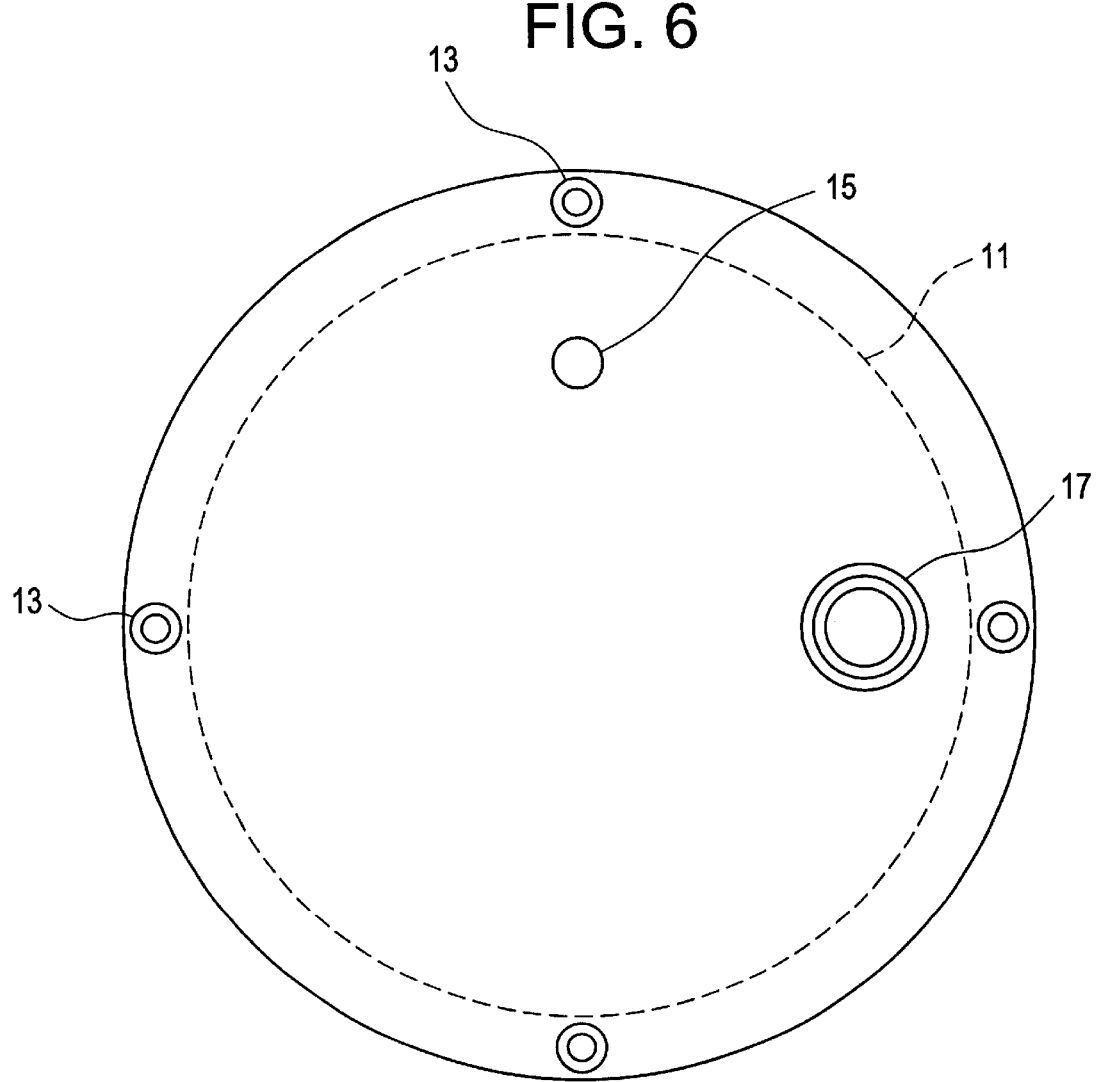
FIG. 6 is a plan view of the cap shown in FIG. 5.

According to a second embodiment, as shown in FIGS. 3 and 4, the base 4 includes a groove 9 that extends from the nest 5 in to the shoulder 6. The groove 9 assists and directs the flow of electrolyte injected through the fill port 17. Also, as shown in FIGS. 5 and 6, the cap 11 includes an additional port, namely, a vacuum port 15. The vacuum port 15 extends through the flat 11, and is in fluid communication with the nest 5, via the groove 9. In this two port construction, the vacuum port 15 allows a vacuum to be drawn on the cell 20, while the fill port 17 provides a passage for injecting liquid electrolyte into the nest 5.

It will be appreciated that the groove 9 may be provided in a fixture 2 having the single port construction shown in FIGS. 1 and 2, i.e., a fixture 2 having a fill port 17, but not a vacuum port 15. Also, the vacuum port 15 may be provided in a fixture 2 that does not include the groove 9. In such an arrangement, the vacuum port 15 would open directly into the nest 5, preferably, a peripheral region of the nest 5.

Of course, the fixture 2 may have more than the two ports 15, 17 described above. For example, the additional ports may be provided for injecting electrolyte, pulling vacuum, or providing passageways for other processing materials, such as inert gasses discussed further with respect to the process of the present invention.

Figure 7:
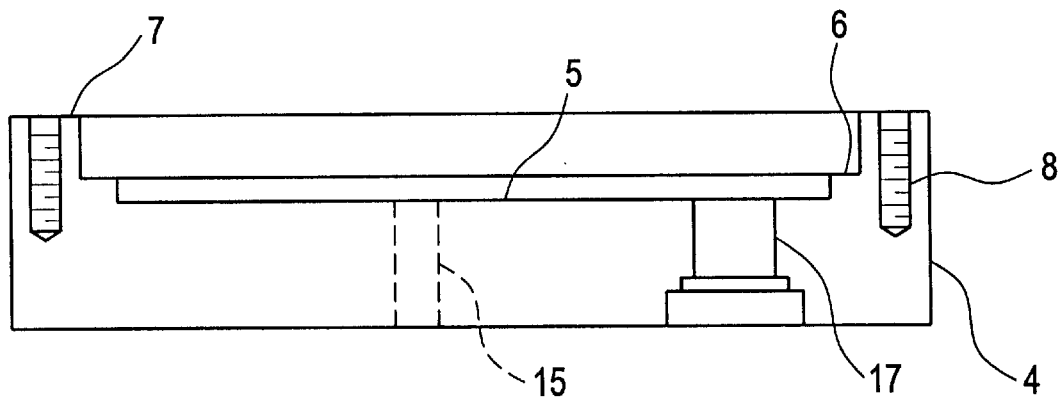
FIG. 7 is a sectional view of the base of the fixture according to a fourth embodiment of the present invention.
Figure 8:
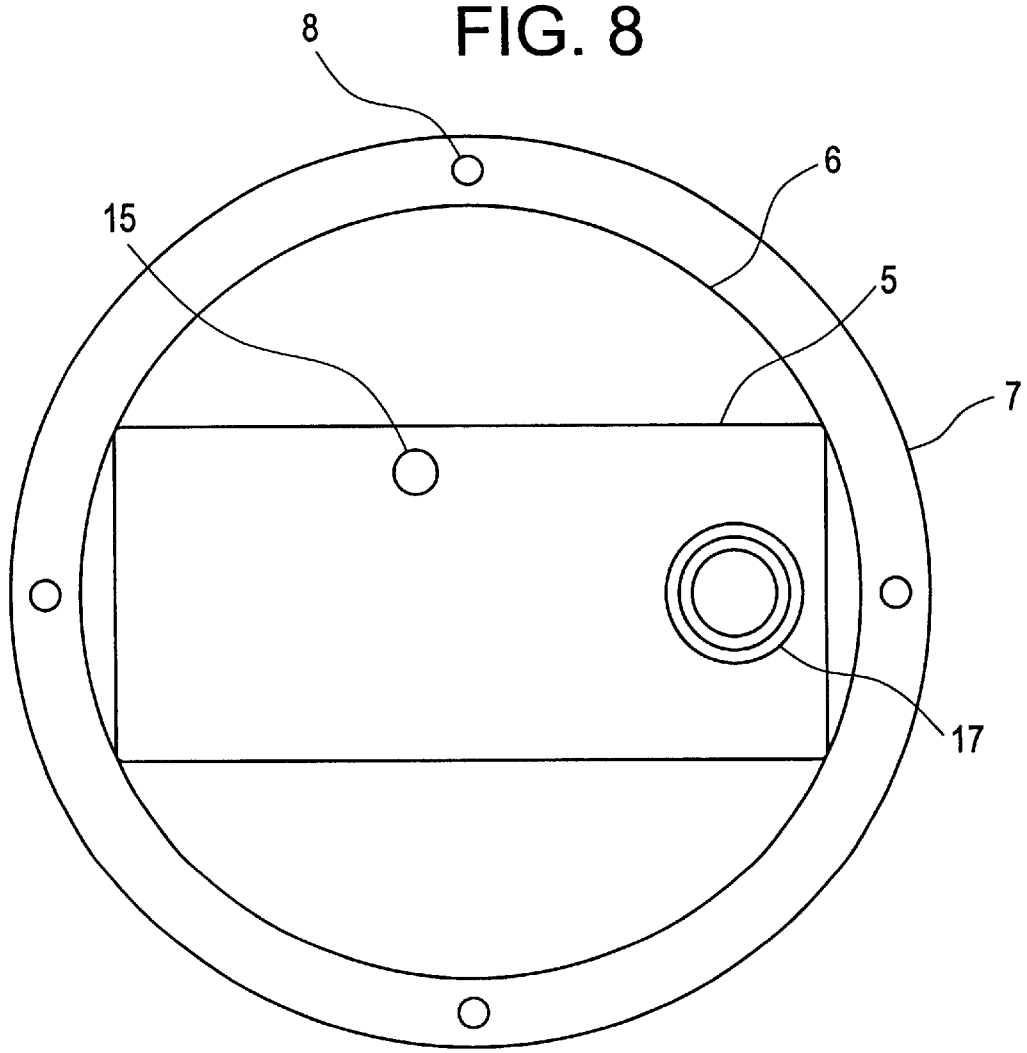
FIG. 8 is a plan view of the base shown in FIG. 7.

Although the groove 9 and nest 5 have been described as component parts of the base 4, these elements may be formed in the cap 10. Also, although the vacuum port 15, fill port 17, and O-ring 16 have been described as component parts of the cap 10, these elements may be formed in the base 4. FIGS. 7 and 8 show the base 4 provided with the vacuum port 15 and the fill port 17.

The bolts 14 may be replaced by any conventional fastener that allows the fixture 2 to be opened and closed to allow removal and insertion of the cell 20. Such conventional fasteners may include dowels, pins, clamps, clips, hinges, rivets, screws, and latches. These fasteners are well known in this art, and therefore, a detailed discussion of the same is omitted.

II. The Process

The present impregnation process may be carried out using any of the fixtures described above. For convenience, the process will be discussed in detail with respect to a fixture having a two port construction, i.e., a vacuum port 15 and a fill port 17.

Step 1: The cell 20 is placed in the nest 5 of the base 4. The cap 10 is secured to the base 4 to provide an air tight enclosure around the cell 20.

Step 2: A vacuum is drawn on the cell 20 via the vacuum port 15. Preferably, the vacuum is held for more than two seconds at an intensity of 5–30 inch Hg.

Step 3: An electrolyte is metered into the fixture 2 via the fill port 17. Preferably, the metering occurs over a time period of 1–30 sec. During this introducing step, the vacuum state within the fixture 2 assists the flow of electrolyte into the nest 5. The groove 9, if provided, also assists the flow of electrolyte toward the perimeter of the cell 20.

Step 4: Preferably, the electrolyte is allowed to impregnate the cell 20 for a time period of 0–5 min. The impregnation time may be accelerated by injecting an inert gas blanket into the fixture 2, thereby releasing the vacuum. The inert gas blanket may be injected into the fixture 2 to raise the gauge pressure of the fixture 2 to about 0–130 psi. The inert gas blanket may be injected via the vacuum port 15, the fill port 17, or an additional port (not shown) that is dedicated for injecting inert gas. Typical inert gases include nitrogen and argon. However, other gases may be used depending on the particular application.

Step 5: Finally, the fixture 2 is opened, and the impregnated cell 20 is removed. The impregnated cell 20 may then be transferred to a subsequent process, such as packaging.

Depending on the specific application, the fixture 2 may be heated or cooled so that impregnation occurs at an optimal temperature. In general, elevated temperatures increase the speed of impregnation, as well as increase the equilibrium uptake of the electrolyte. Impedance spectroscopy of newly filled cells has shown that increasing the fixture temperature to about 60° C. shortens the time to achieve equilibrium uptake from greater than 24 hours to only around 3 hours. Combined with vacuum, higher temperatures could lead to even shorter times to reach equilibrium uptake.

In addition, higher fixture temperatures increase the amount of solvents absorbed by polymers in the cell. As a result, the electrolyte uptake amount is greater than the electrolyte uptake amount at room temperature. Increased electrolyte uptake is advantageous if the particular application requires additional electrolyte for optimal performance.

The process of the present invention may be carried out using a fixture 2 having the single port construction shown in FIGS. 1 and 2. In this case, the process steps are similar to the ones described above. However, the process steps that require communication with the cell 20 are carried out via the single port (fill port 17). Specifically, the single port facilitates the vacuum pulling step (Step 2), the electrolyte metering step (Step 3), and the inert gas injecting step (optional Step 4).

The present invention provides improved control over electrolyte delivery. Namely, the present process provides an increase in the percent uptake of the injected electrolyte. In other words, almost all of the injected electrolyte impregnates the cell. Accordingly, the total electrolyte consumption is significantly reduced. Further, the cell impregnation occurs before the cell is packaged. Therefore, during a packaging process, no free electrolyte contaminates the seal areas of the package. In this way, the cell package integrity is increased.

What is claimed is:

1. A fixture for fabricating a cell, said fixture comprising:
an enclosure, which is not part of a finished cell package, with a nest that is shaped to receive the cell therein; and
a fill port provided in said enclosure and in communication with said nest;
wherein, when said nest receives the cell, said fill port provides a passage through which an electrolyte is injected into said nest;
wherein, when said nest receives the cell, said fill port provides a passage through which a vacuum is applied to the cell.

2. The fixture of claim 1, wherein said enclosure includes:
a base; and
a cap removably provided on said base.

3. The fixture of claim 2, wherein said base is provided with said fill port.

4. The fixture of claim 2, wherein said cap is provided with said fill port.

5. The fixture of claim 2, wherein said nest is provided in said base.

6. A fixture for fabricating a cell, said fixture comprising:
an enclosure, which is not part of a finished cell package, with a nest that is shaped to receive the cell therein;
a fill port provided in said enclosure and in communication with said nest;
wherein, when said nest receives the cell, said fill port provides a passage through which an electrolyte is injected into said nest; and
a vacuum port provided in said enclosure and in communication with said nest;
wherein, when said next receives the cell, said vacuum port provides a passage through which a vacuum is applied to the cell.

7. The fixture of claim 6, wherein said enclosure further comprises:
   a base; and
   a cap removably provided on said base.

8. The fixture of claim 7, wherein said fill port and said vacuum port are provided in said base.

9. The fixture of claim 7, wherein said fill port and said vacuum port are provided in said cap.

10. The fixture of claim 7, wherein said nest is provided in said base.

* * * * *